US012613015B1

(12) United States Patent
Chen

(10) Patent No.: US 12,613,015 B1
(45) Date of Patent: Apr. 28, 2026

(54) SPLICED LIGHTING DEVICE

(71) Applicant: Ching-Hui Chen, Huizhou City (CN)

(72) Inventor: Ching-Hui Chen, Huizhou City (CN)

( * ) Notice: Subject to any disclaimer, the term of this patent is extended or adjusted under 35 U.S.C. 154(b) by 0 days.

(21) Appl. No.: 19/250,387

(22) Filed: Jun. 26, 2025

(51) Int. Cl.
*F21S 2/00* (2016.01)

(52) U.S. Cl.
CPC .................................... *F21S 2/005* (2013.01)

(58) Field of Classification Search
CPC ........ F21V 33/0012; A47F 3/001; F21S 2/005
See application file for complete search history.

(56) References Cited

U.S. PATENT DOCUMENTS 12,262,822 B1 * 4/2025 Zheng .................... A47F 3/001

FOREIGN PATENT DOCUMENTS

CN 201513783 U * 6/2010 ............. F21V 15/01

OTHER PUBLICATIONS

Innovation Q+ NPL (Year: 2025).*

* cited by examiner

*Primary Examiner* — Anabel Ton
(74) *Attorney, Agent, or Firm* — WPAT, PC

(57) ABSTRACT

A spliced lighting device includes a frame, a first bracket and a first light source board. The frame includes a plurality of frame strips spliced with each other. The frame strips are hollow, and includes a first frame strip having a first opening and a first groove. The first groove is disposed on the inner surface of the first frame strip and corresponding to the first opening. The first bracket has a first protrusion disposed on one side of the first bracket and inserted into the first groove, such that the first bracket is fixed on the inner surface of the first frame strip. The first light source board is disposed on the other side of the first bracket.

9 Claims, 15 Drawing Sheets

SPLICED LIGHTING DEVICE

TECHNICAL FIELD

The present invention relates to a lighting device, in particular to a spliced lighting device.

BACKGROUND

At present, some storage shelves have integrated lighting functions into the structures thereof to provide users with additional light sources. However, in order to embed the light sources into the storage shelves, the structural design of these products has become extremely complex, so the manufacturing processes of these products are complicated, which significantly increases the manufacturing costs of these storage shelves.

Furthermore, due to the configuration of the internal structure of these storage shelves, the lighting devices are usually limited to projecting light in a single direction, resulting in a constrained illumination range that cannot evenly cover the entire space. As a result, the lighting performance of these currently available products still need to be further improved, particularly in enhancing the uniformity of light distribution and expanding the illumination range.

SUMMARY

One embodiment of the present invention provided a spliced lighting device, which includes a frame, a first bracket and a first light source board. The frame includes a plurality of frame strips spliced with each other. The frame strips are hollow, and includes a first frame strip having a first opening and a first groove. The first groove is disposed on the inner surface of the first frame strip and corresponding to the first opening. The first bracket has a first protrusion disposed on one side of the first bracket and inserted into the first groove, such that the first bracket is fixed on the inner surface of the first frame strip. The first light source board is disposed on the other side of the first bracket.

In one embodiment, the spliced lighting device further includes a first lens disposed on the first opening to cover the first opening.

In one embodiment, the frame strips includes a second frame strip having a second opening and a second groove. The second groove is disposed on the inner surface of the second frame strip and corresponding to the second opening.

In one embodiment, the first frame strip and the second frame strip are arranged opposite to each other.

In one embodiment, the orientation of the first opening is different from the orientation of the second opening.

In one embodiment, the spliced lighting device further includes a second bracket. One side of the second bracket has a second protrusion and the second protrusion is inserted into the second groove, such that the second bracket is fixed on the inner surface of the second frame strip.

In one embodiment, the spliced lighting device further includes a second light source board disposed on the other side of the second bracket.

In one embodiment, the spliced lighting device further includes a second lens disposed on the second opening to cover the second opening.

In one embodiment, the spliced lighting device further includes a plurality of connection elements. The frame strips are spliced with each other via the connection elements.

In one embodiment, each of the frame strips is formed by folding a foldable board.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

BRIEF DESCRIPTION OF THE DRA WINGS

The present invention will become more fully understood from the detailed description given herein below and the accompanying drawings which are given by way of illustration only, and thus are not limitative of the present invention and wherein.

DETAILED DESCRIPTION

Figure 1:
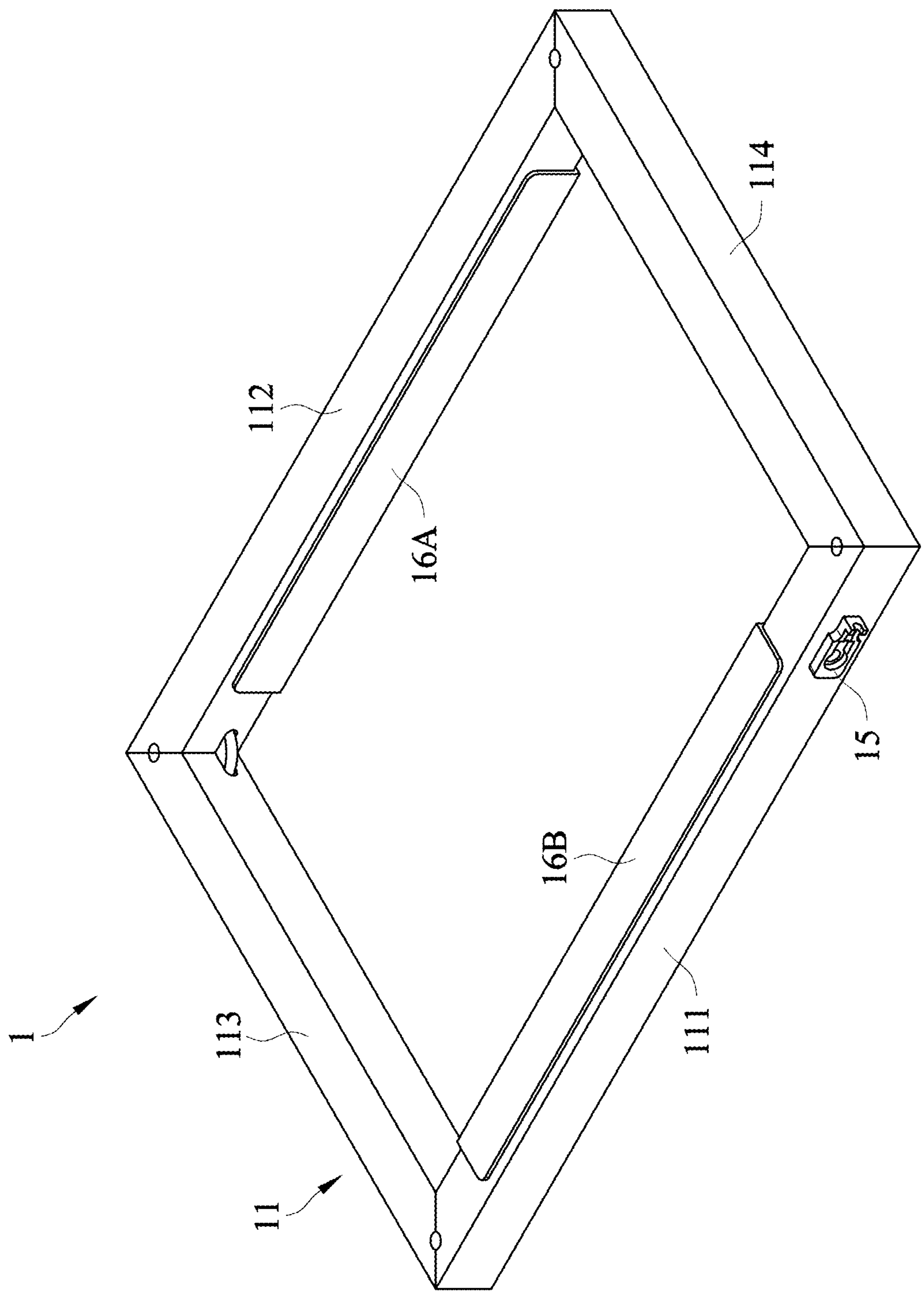
FIG. 1 is a perspective view of a spliced lighting device in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
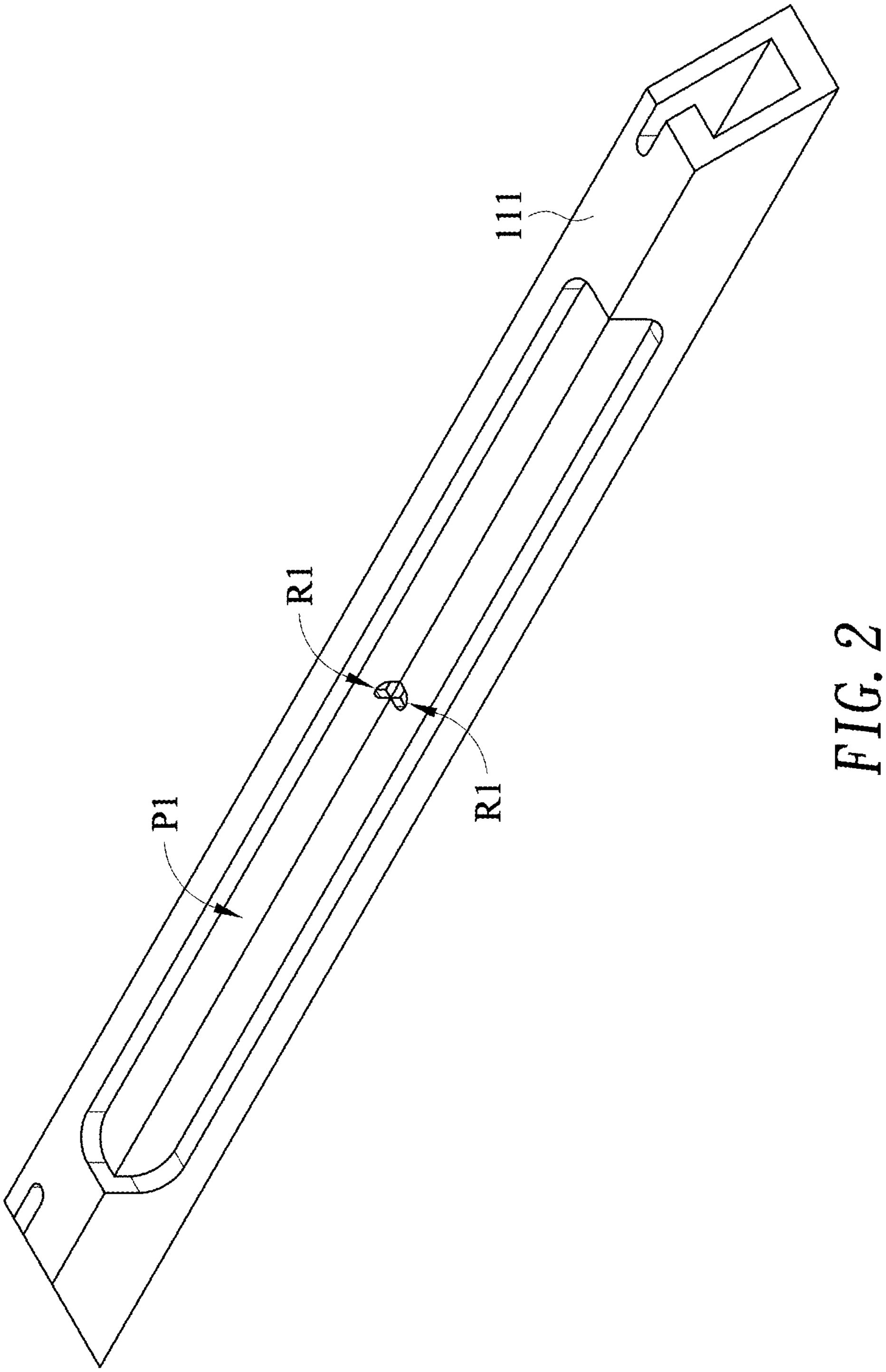
FIG. 2 is a perspective view of a first frame strip of the spliced lighting device in accordance with one embodiment of the present invention.
Figure 3:
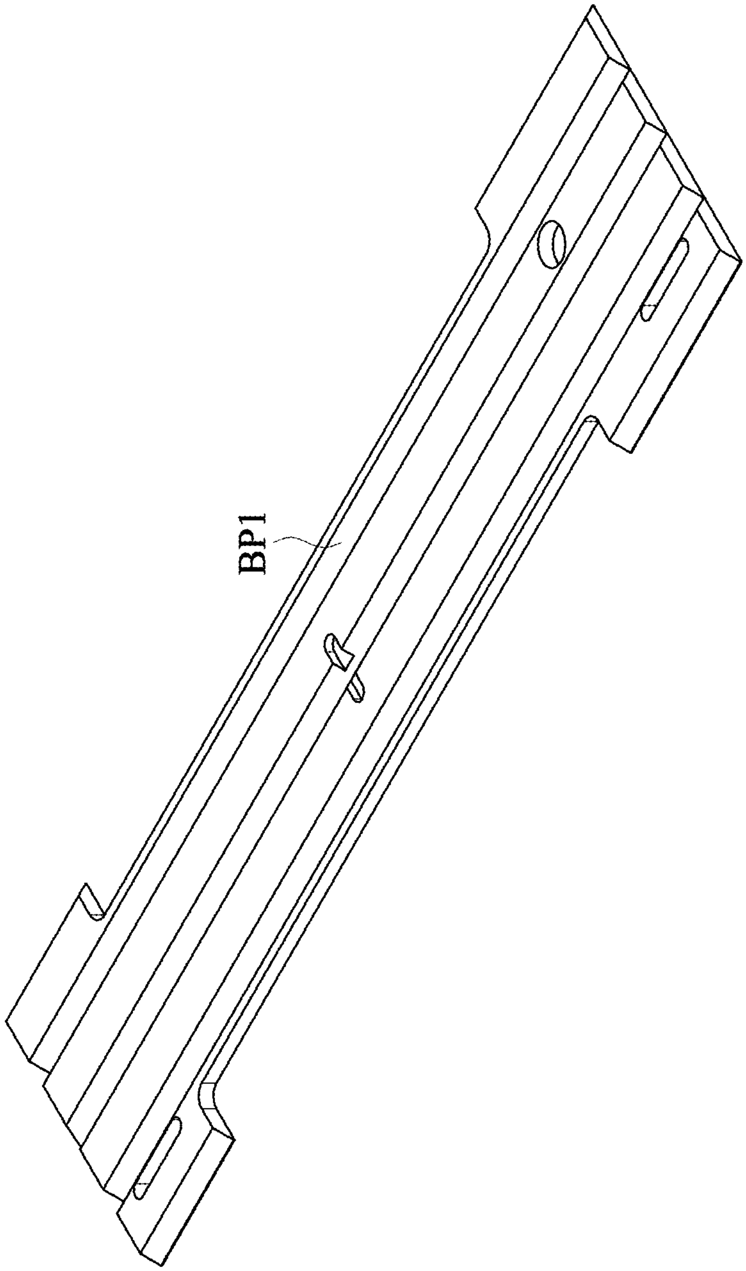
FIG. 3 is a perspective view of a foldable board corresponding to the first frame strip of the spliced lighting device in accordance with one embodiment of the present invention.
Figure 4:
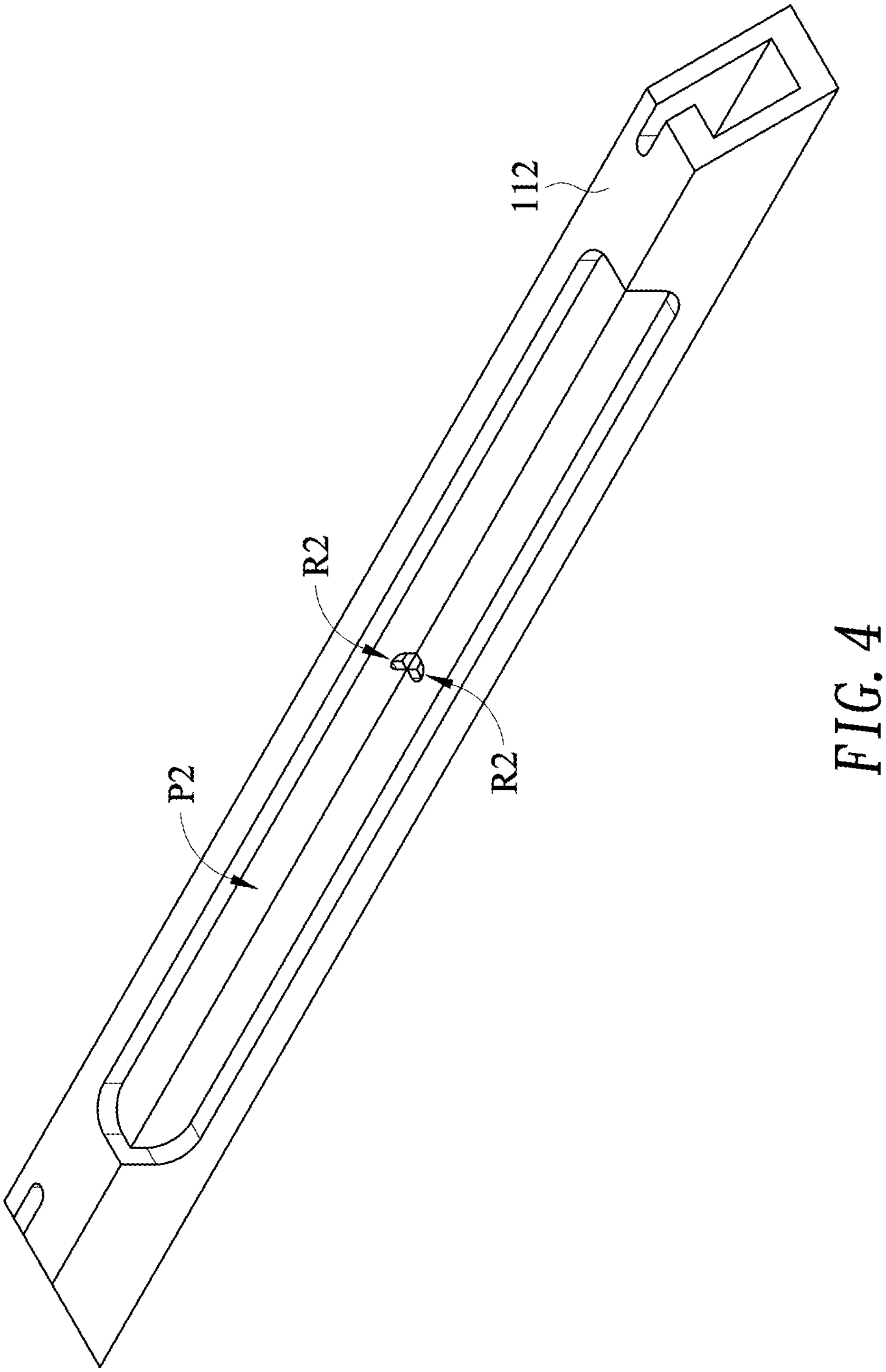
FIG. 4 is a perspective view of a second frame strip of the spliced lighting device in accordance with one embodiment of the present invention.
Figure 5:
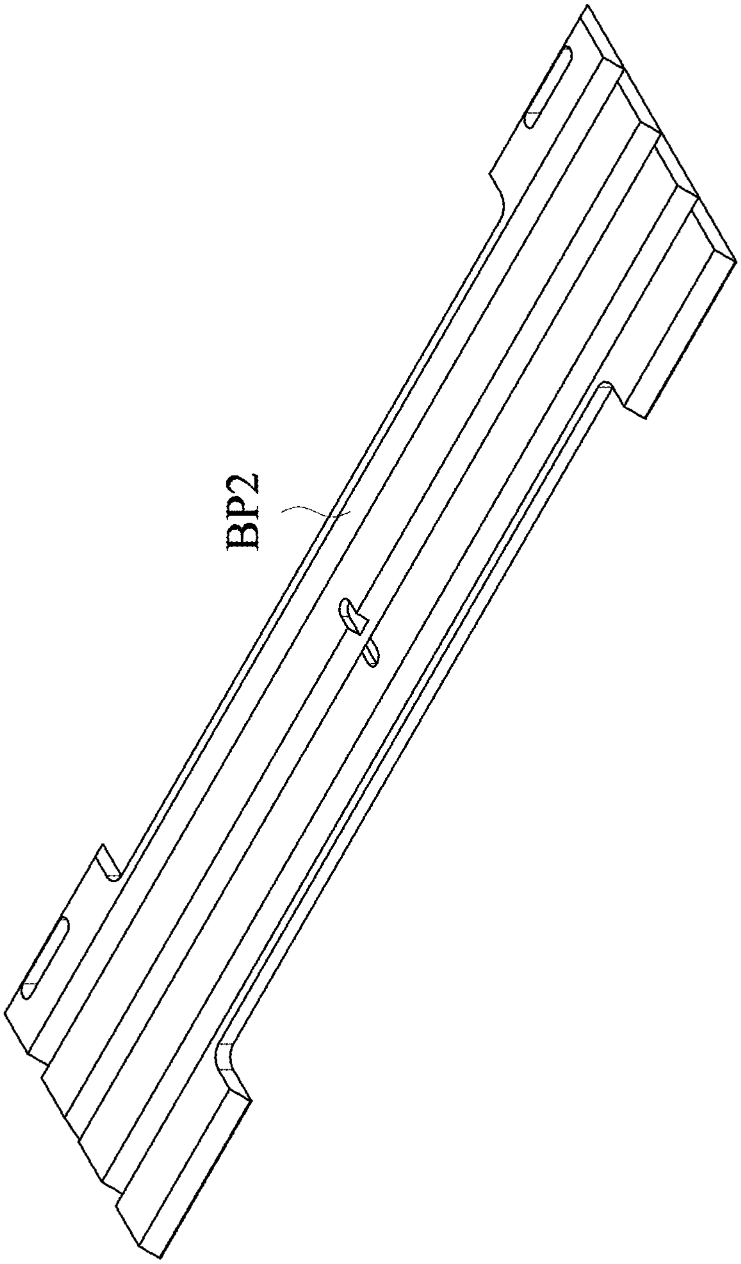
FIG. 5 is a perspective view of a foldable board corresponding to the second frame strip of the spliced lighting device in accordance with one embodiment of the present invention.
Figure 6:
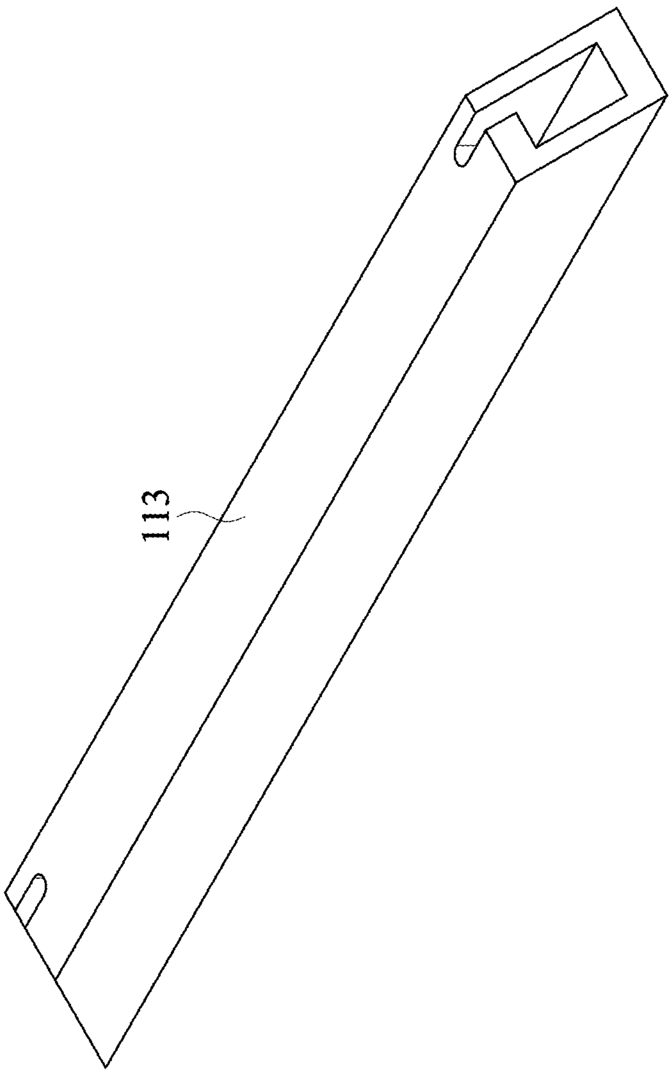
FIG. 6 is a perspective view of a third frame strip of the spliced lighting device in accordance with one embodiment of the present invention.
Figure 7:
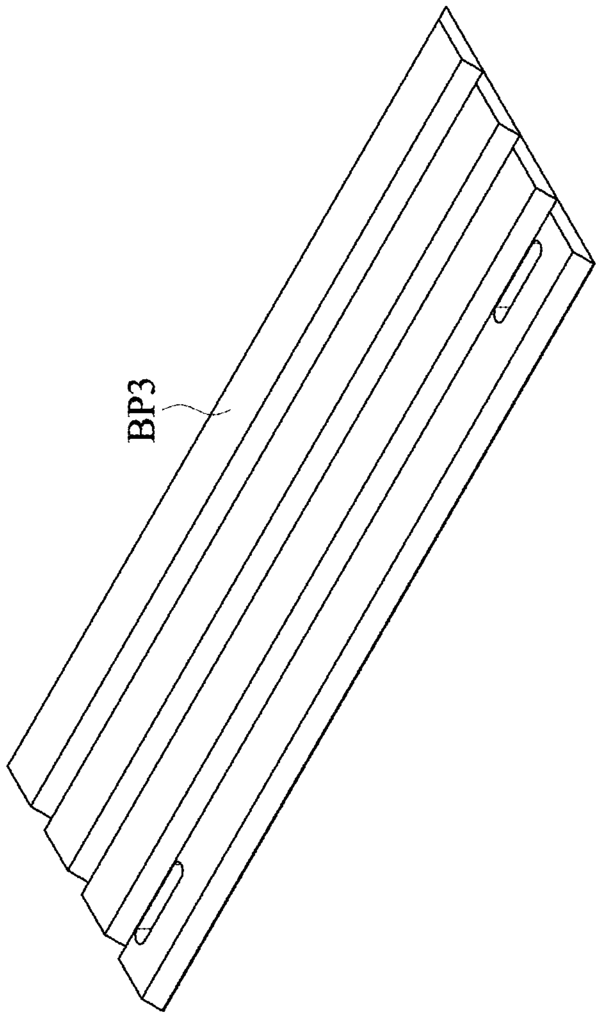
FIG. 7 is a perspective view of a foldable board corresponding to the third frame strip of the spliced lighting device in accordance with one embodiment of the present invention.

Please refer to FIG. 1, FIG. 2, FIG. 3, FIG. 4, FIG. 5, FIG. 6 and FIG. 7. FIG. 1 is a perspective view of a spliced lighting device in accordance with one embodiment of the present invention. FIG. 2 is a perspective view of a first frame strip of the spliced lighting device in accordance with one embodiment of the present invention. FIG. 3 is a perspective view of a foldable board corresponding to the first frame strip of the spliced lighting device in accordance with one embodiment of the present invention. FIG. 4 is a perspective view of a second frame strip of the spliced lighting device in accordance with one embodiment of the present invention. FIG. 5 is a perspective view of a foldable board corresponding to the second frame strip of the spliced lighting device in accordance with one embodiment of the present invention. FIG. 6 is a perspective view of a third frame strip of the spliced lighting device in accordance with one embodiment of the present invention. FIG. 7 is a perspective view of a foldable board corresponding to the third frame strip of the spliced lighting device in accordance with one embodiment of the present invention. As shown in FIG. 1, the spliced lighting device 1 includes a frame 11. The frame 11 includes a plurality of frame strips spliced with each other. These frame strips include a first frame strip 111, a second frame strip 112, a third frame strip 113, and a fourth frame strip 114. The number of these frame strips may vary according to actual requirements. The spliced lighting device 1 can be combined with several support posts to serve as a storage shelf for various purposes.

As shown in FIG. 2, the first frame strip 111 is hollow. The first frame strip 111 has a first opening P1 and a plurality of first grooves R1. These first grooves R1 are disposed on the inner surface of the first frame strip 111 and corresponding to the first opening P1. In this embodiment, the first frame strip 111 has two first grooves R1. In another embodiment, the first frame strip 111 may have only one first groove R1. The number of first grooves R1 may vary according to actual requirements.

As shown in FIG. 3, the first frame strip 111 can be formed by folding a foldable board BP1. The foldable board BP1 may have several grooves and notches, such that the foldable board BP1 can be folded into a columnar shape with an opening. The foldable board BP1 may be made of wood, metal, or plastics.

As shown in FIG. 4, the second frame strip 112 is hollow. The first frame strip 111 and the second frame strip 112 are arranged opposite to each other. The second frame strip 112 has a second opening P2 and a plurality of second grooves R2. The orientation of the second opening P2 is different from that of the first opening P1. These second grooves R2 are disposed on the inner surface of the second frame strip 112 and corresponding to the second opening P2. In this embodiment, the second frame strip 112 has two second grooves R2. In another embodiment, the second frame strip 112 may have only one second groove R2. The number of second grooves R2 may vary according to actual requirements.

As shown in FIG. 5, the second frame strip 112 can also be formed by folding a foldable board BP2. The foldable board BP2 may have several grooves and notches, such that the foldable board BP2 can be folded into a columnar shape with an opening. The foldable board BP2 may be made of wood, metal, or plastics.

As shown in FIG. 6, the third frame strip 113 is hollow. The length of the third frame strip 113 may be slightly shorter than that of the first frame strip 111.

As shown in FIG. 7, the third frame strip 113 can be formed by folding a foldable board BP3. The foldable board BP3 may have several grooves, such that the foldable board BP3 can be folded into a columnar shape. Similarly, the foldable board BP3 may be made of wood, metal, or plastics. The third frame strip 113 and the fourth frame strip 114 are arranged opposite to each other. The structure of the fourth frame strip 114 is the same as that of the third frame strip 113.

The embodiment just exemplifies the present invention and is not intended to limit the scope of the present invention; any equivalent modification and variation according to the spirit of the present invention is to be also included within the scope of the following claims and their equivalents.

Figure 8:
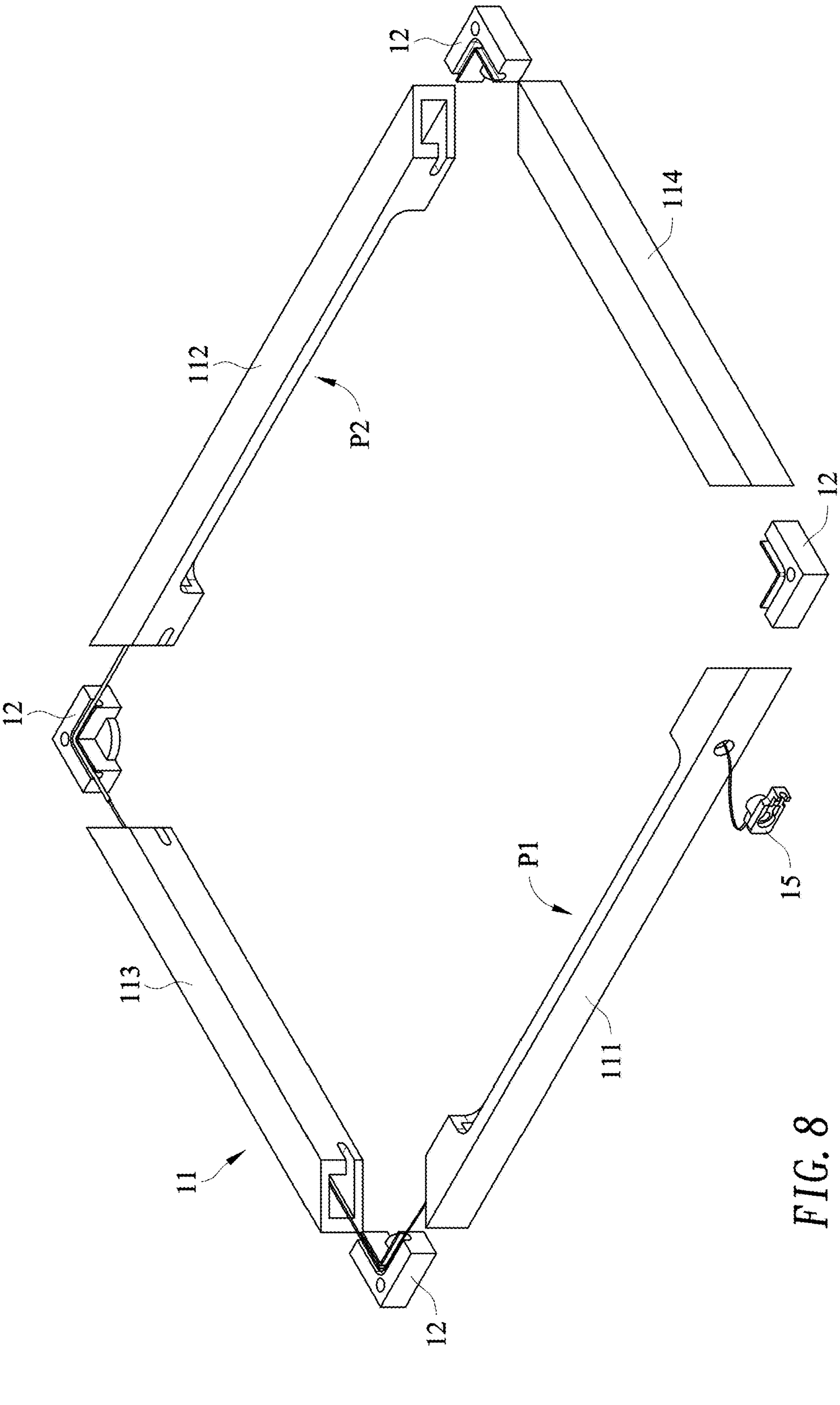
FIG. 8 is a first exploded view of the spliced lighting device in accordance with one embodiment of the present invention.

Please refer to FIG. 8, which is a first exploded view of the spliced lighting device in accordance with one embodiment of the present invention. As shown in FIG. 8, the spliced lighting device 1 further includes a plurality of connection elements 12. The first frame strip 111, the second frame strip 112, the third frame strip 113, and the fourth frame strip 114 can be spliced with each other via these connection elements 12. These connection elements 12 may be L-shaped. Two adjacent frame strips can be connected via one connection element 12; one end of the connection element 12 is inserted into one end of one frame strip, and the other end of the connection element 12 is inserted into one end of another frame strip. In this way, these frame strips can be fixed together.

The embodiment just exemplifies the present invention and is not intended to limit the scope of the present invention; any equivalent modification and variation according to the spirit of the present invention is to be also included within the scope of the following claims and their equivalents.

Figure 9:
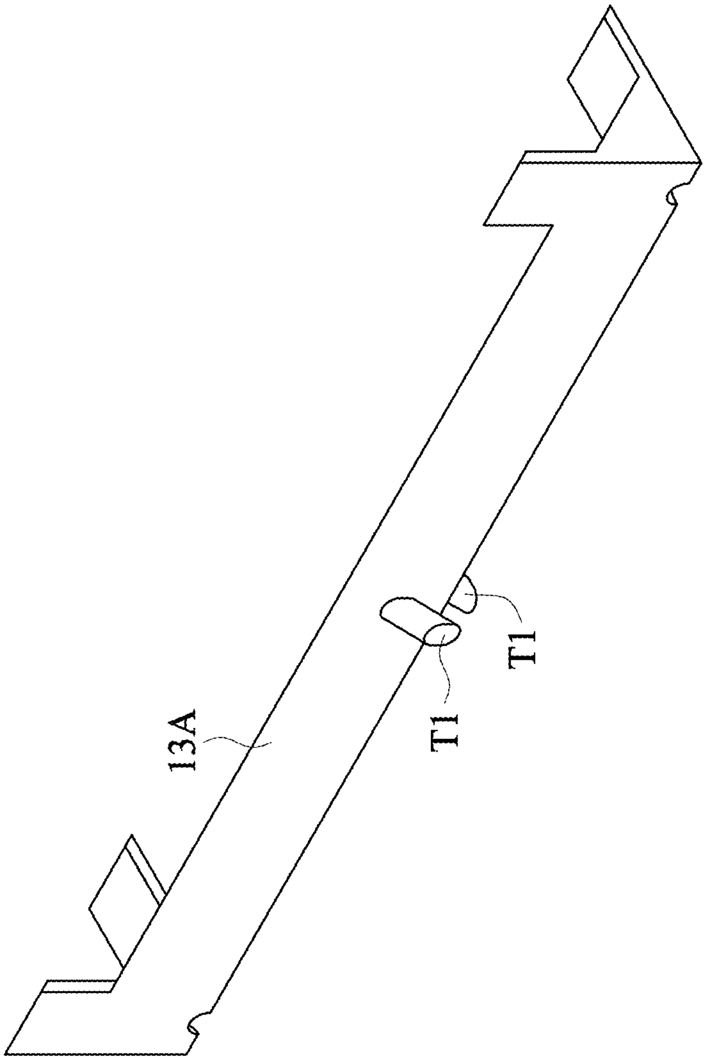
FIG. 9 is a perspective view of a first bracket of the spliced lighting device in accordance with one embodiment of the present invention.
Figure 10:
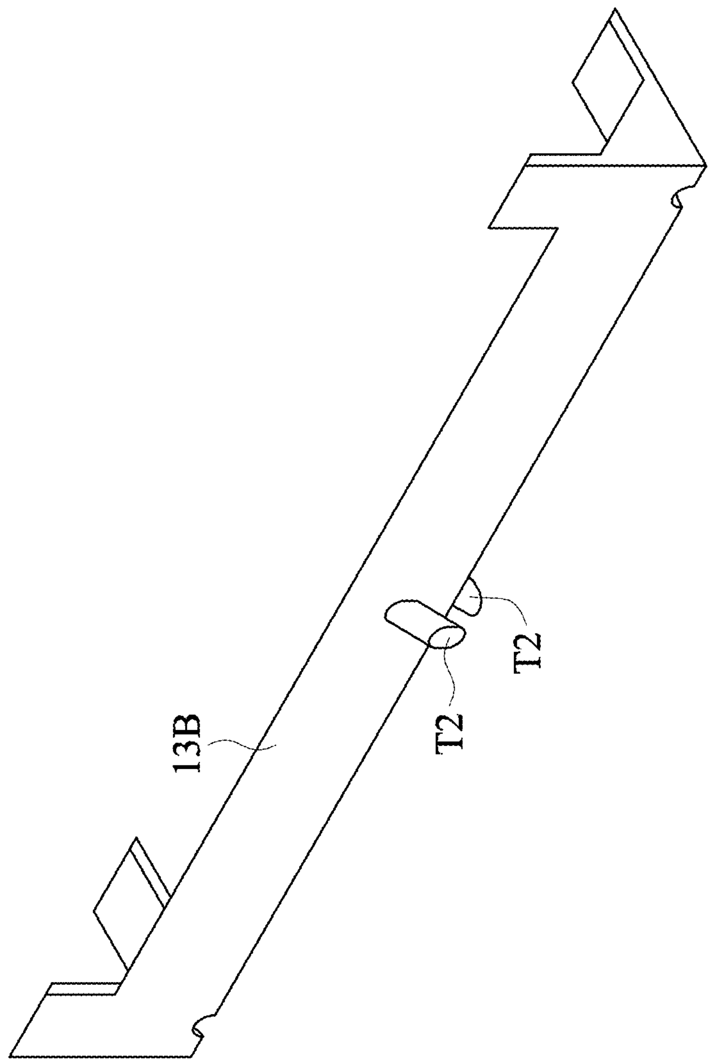
FIG. 10 is a perspective view of a second bracket of the spliced lighting device in accordance with one embodiment of the present invention.
Figure 11:
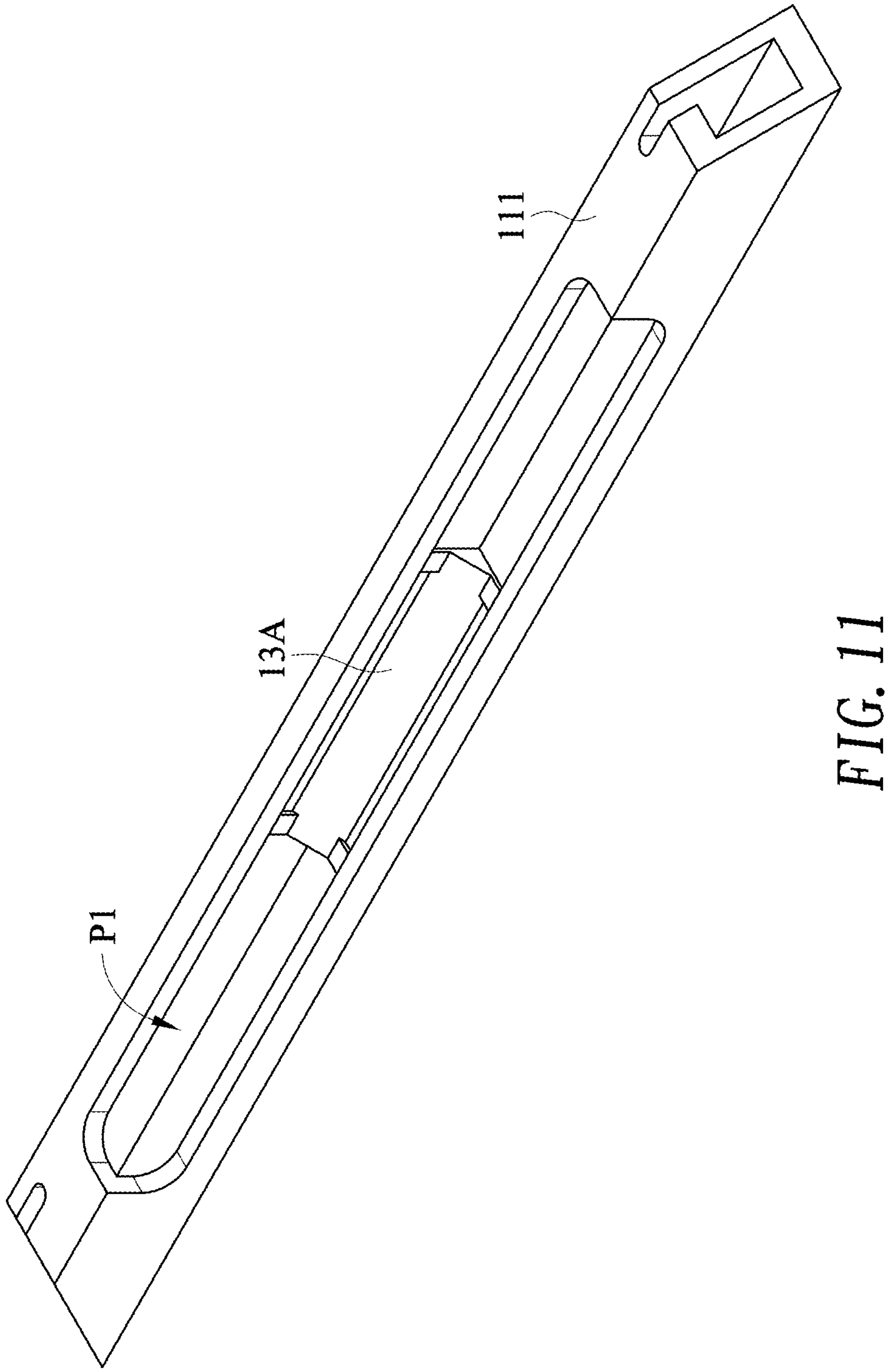
FIG. 11 is a schematic view of combining the first bracket with the first frame strip of the spliced lighting device in accordance with one embodiment of the present invention.
Figure 12:
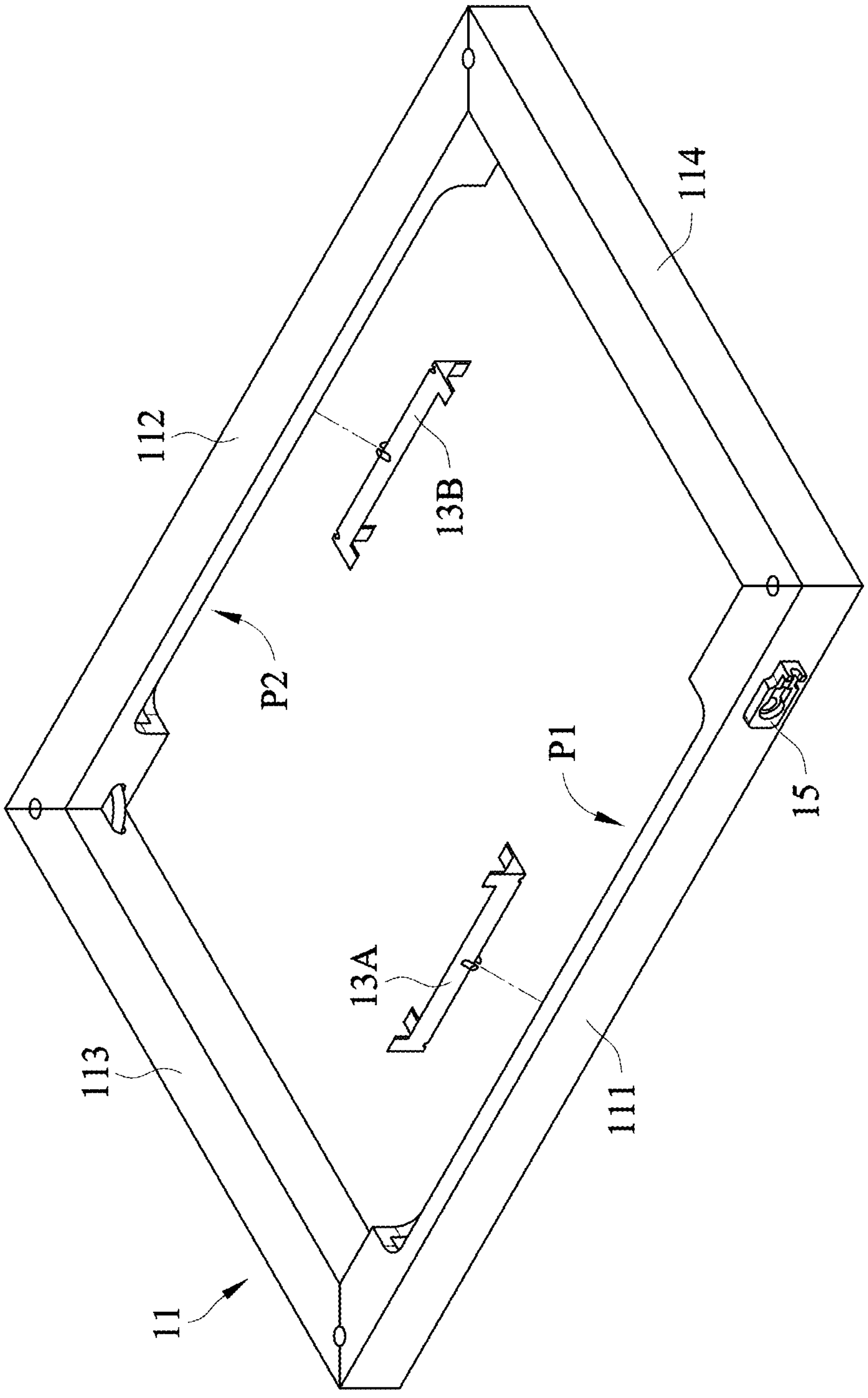
FIG. 12 is a second exploded view of the spliced lighting device in accordance with one embodiment of the present invention.

Please refer to FIG. 9, FIG. 10, FIG. 11 and FIG. 12. FIG. 9 is a perspective view of a first bracket of the spliced lighting device in accordance with one embodiment of the present invention. FIG. 10 is a perspective view of a second bracket of the spliced lighting device in accordance with one embodiment of the present invention. FIG. 11 is a schematic view of combining the first bracket with the first frame strip of the spliced lighting device in accordance with one embodiment of the present invention. FIG. 12 is a second exploded view of the spliced lighting device in accordance with one embodiment of the present invention. As shown in FIG. 9, the spliced lighting device 1 further includes a first bracket 13A. The cross-section of the first bracket 13A may be L-shaped. The first bracket 13A has two first protrusions T1. These first protrusions T1 are disposed on one side of the first bracket 13A and corresponding to the first grooves R1 of the first frame strip 111. In another embodiment, the first bracket 13A may have only one first protrusion T1. The number of first protrusions T1 may vary according to actual requirements.

As shown in FIG. 10, the spliced lighting device 1 further includes a second bracket 13B. The cross-section of the second bracket 13B may be L-shaped. The second bracket 13B has two second protrusions T2. These second protrusions T2 are disposed on one side of the second bracket 13B and corresponding to the second grooves R2 of the second frame strip 112. In another embodiment, the second bracket 13B may have only one second protrusion T2. The number of second protrusions T2 may vary according to actual requirements.

As shown in FIG. 11 and FIG. 12, the first protrusions T1 can be inserted into the first grooves R1 of the first frame strip 111, so the first bracket 13A can be stably fixed to the first frame strip 111 and preventing the first bracket 13A from moving or falling due to external forces. Similarly, the second protrusions T2 can be inserted into the second grooves R2 of the second frame strip 112, so the second bracket 13B can be stably fixed to the second frame strip 112 and preventing the second bracket 13B from moving or falling due to external forces.

The embodiment just exemplifies the present invention and is not intended to limit the scope of the present invention; any equivalent modification and variation according to the spirit of the present invention is to be also included within the scope of the following claims and their equivalents.

Figure 13:
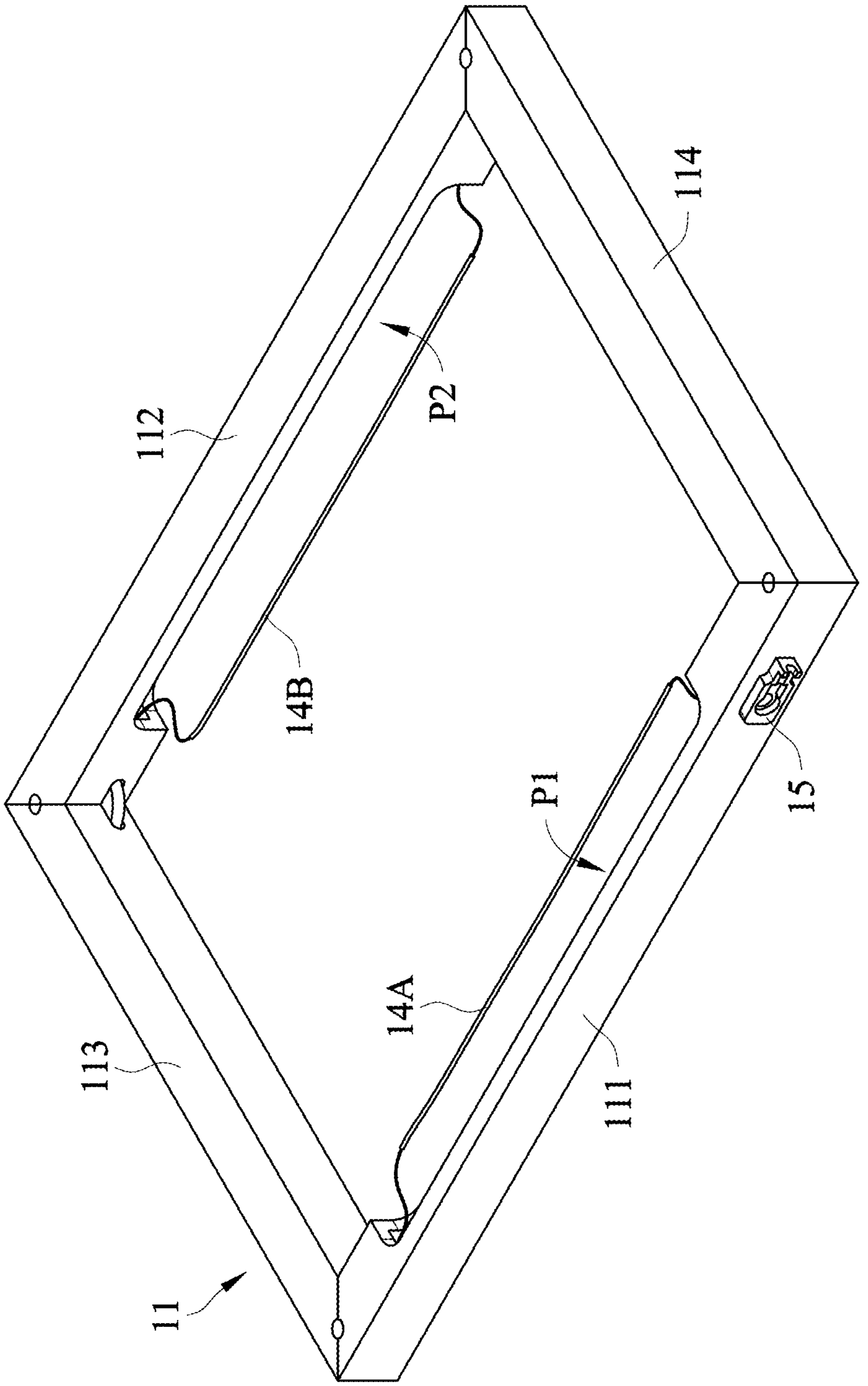
FIG. 13 is a third exploded view of the spliced lighting device in accordance with one embodiment of the present invention.

Please refer to FIG. 13, which is a third exploded view of the spliced lighting device in accordance with one embodiment of the present invention. As shown in FIG. 13, the spliced lighting device 1 further includes a first light source board 14A, a second light source board 14B, and a connection interface 15. The first light source board 14A is disposed on the other side of the first bracket 13A and fixed to the first bracket 13A. The second light source board 14B is disposed on the other side of the second bracket 13B and fixed to the second bracket 13B. Additionally, the first light source board 14A and the second light source board 14B are electrically connected to the connection interface 15 via wires to connect to an external power source (such as a utility power). The first light source board 14A includes a circuit board and a plurality of LEDs disposed thereon. The structure of the second light source board 14B is the same with that of the first light source board 14A.

The embodiment just exemplifies the present invention and is not intended to limit the scope of the present invention; any equivalent modification and variation according to the spirit of the present invention is to be also included within the scope of the following claims and their equivalents.

Figure 14:
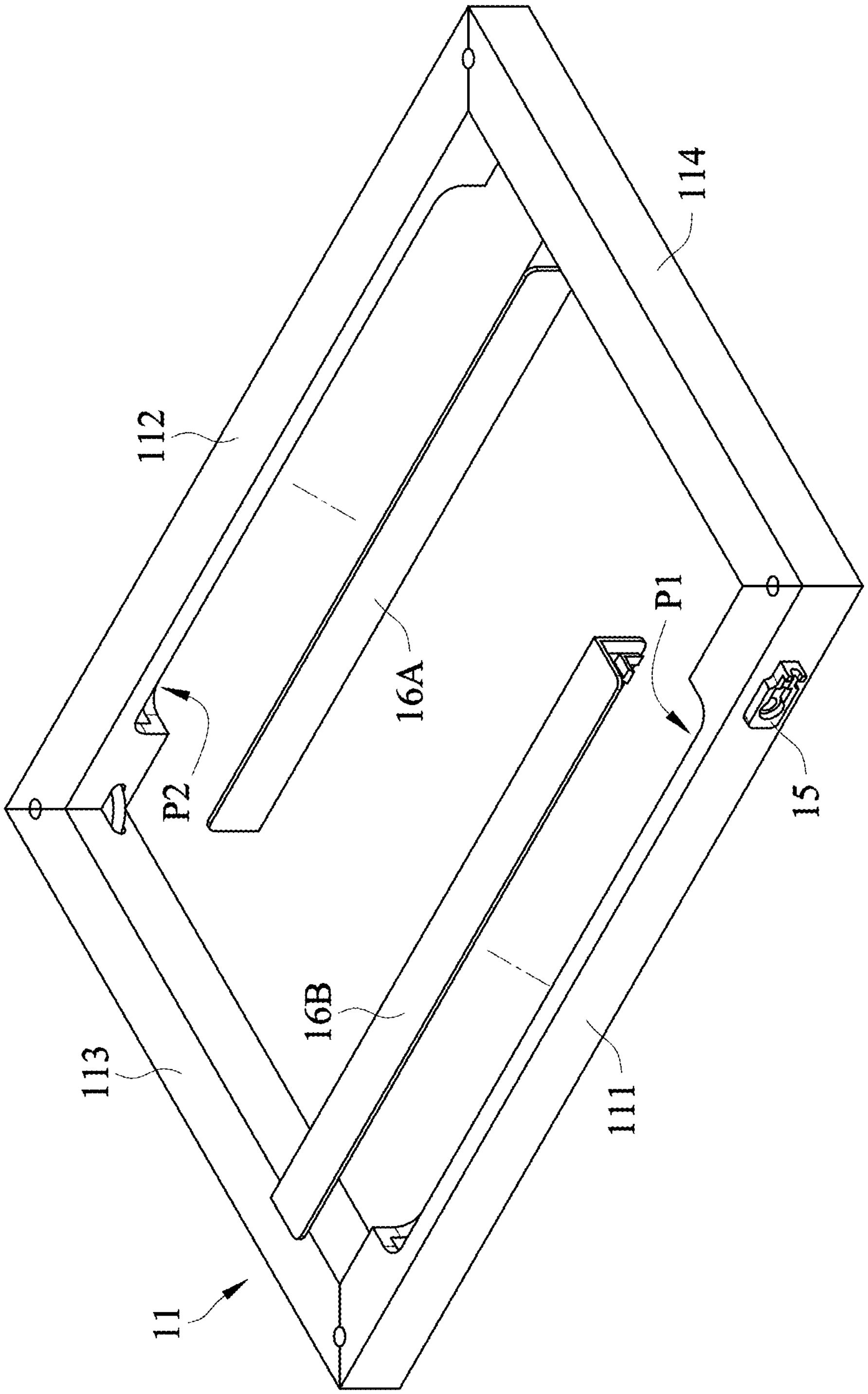
FIG. 14 is a fourth exploded view of the spliced lighting device in accordance with one embodiment of the present invention.

Please refer to FIG. 14, which is a fourth exploded view of the spliced lighting device in accordance with one embodiment of the present invention. As shown in FIG. 14, the spliced lighting device 1 further includes a first lens 16A and a second lens 16B. The first lens 16A is disposed on the first opening P1 to cover the first opening P1. The second lens 16B is disposed on the second opening P2 to cover the second opening P2.

As previously stated, the direction of the first opening P1 is upward, while the direction of the second opening P2 is downward. Therefore, the light of the spliced lighting device 1 can be projected in at least two directions so as to improve the uniformity of light distribution. Additionally, the illumination range of the spliced lighting device 1 can be expanded.

Via the structural design of the first protrusions T1 and the first grooves R1, the first bracket 13A can be conveniently fixed to the inner surface of the first frame strip 111 and is less likely to fall off. Similarly, through the structural design of the second protrusions T2 and the second grooves R2, the second bracket 13B can be conveniently fixed to the inner surface of the second frame strip 112 and is less likely to fall off. Therefore, both the manufacturing and assembly processes of the spliced lighting device 1 can be significantly simplified, which can greatly reduce the overall cost of the spliced lighting device 1.

The embodiment just exemplifies the present invention and is not intended to limit the scope of the present invention; any equivalent modification and variation according to the spirit of the present invention is to be also included within the scope of the following claims and their equivalents.

It is worthy to point out that, the structural design of the currently available storage shelves having lighting functions has become extremely complex, so the manufacturing processes of these products are complicated, which significantly increases the manufacturing costs of these products. Furthermore, due to the configuration of the internal structure of these storage shelves, the lighting devices are usually limited to projecting light in a single direction, resulting in a constrained illumination range that cannot evenly cover the entire space. As a result, the lighting performance of these currently available products still need to be further improved, particularly in enhancing the uniformity of light distribution and expanding the illumination range. By contrast, according to the embodiments of the present invention, the spliced lighting device includes a frame, a first bracket and a first light source board. The frame includes a plurality of frame strips spliced with each other. The frame strips are hollow, and includes a first frame strip having a first opening and a first groove. The first groove is disposed on the inner surface of the first frame strip and corresponding to the first opening. The first bracket has a first protrusion disposed on one side of the first bracket and inserted into the first groove, such that the first bracket is fixed on the inner surface of the first frame strip. The first light source board is disposed on the other side of the first bracket. The spliced lighting device can be combined with several support posts to serve as various storage shelves. Additionally, via the structural design of the first protrusion and first groove, the first bracket can be conveniently fixed to the inner surface of the first frame strip and is less likely to detach. As a result, both the manufacturing and assembly processes of the spliced lighting device can be significantly simplified, which can greatly reduce the overall cost of the spliced lighting device.

Further, according to the embodiments of the present invention, the frame strips include a second frame strip. The spliced lighting device further includes a second bracket and a second light source board. The second frame strip has a second opening and a second groove. The second groove is disposed on the inner surface of the second frame strip and corresponding to the second opening. The second light source board is disposed on the other side of the second bracket. The orientation of the first opening is different from that of the second opening. Thus, the light of the spliced lighting device can be projected in at least two directions, which not only improves the uniformity of light distribution but also expands the illumination range. Therefore, the spliced lighting device can meet actual requirements.

Moreover, according to the embodiments of the present invention, the spliced lighting device can be connected to an external power source via an adapter module. The adapter module includes a controller, which can be used to adjust the light and/or color temperature of the spliced lighting device. The user can operate the controller to adjust the light and/or color temperature of the spliced lighting device according to actual needs. As a result, the spliced lighting device is not only more convenient to use but also more flexible in application. As set forth above, the spliced lighting device according to the embodiments of the present invention can achieve great technical effects.

Figure 15:
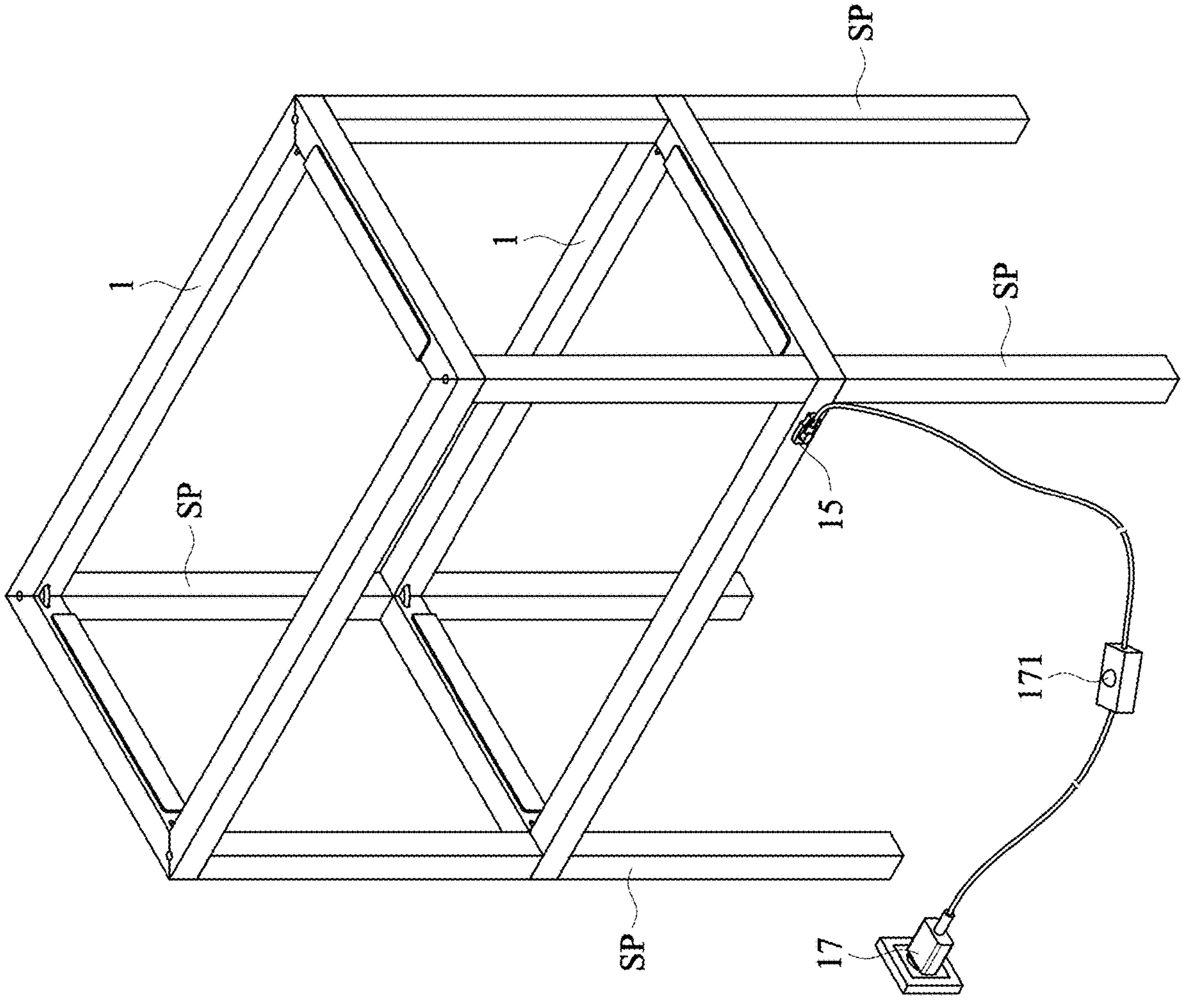
FIG. 15 is a perspective view of a storage shelf having the spliced lighting device in accordance with one embodiment of the present invention.

Please refer to FIG. 15, which is a perspective view of a storage shelf having the spliced lighting device in accordance with one embodiment of the present invention. As shown in FIG. 15, the spliced lighting device 1 can be combined with several support posts SP to serve as various storage shelves.

Additionally, the connection interface 15 of the spliced lighting device 1 can be connected to an external power source (such as a utility power) via an adapter module 17. The adapter module 17 may include a controller 171. The user can operate the controller 171 to adjust the light and/or color temperature of the spliced lighting device 1. Therefore, the spliced lighting device 1 is not only more convenient to use but also more flexible in application.

In another embodiment, the third frame strip 113 and the fourth frame strip 114 may also be equipped with light sources and have different light projection directions, which can be adjusted according to actual requirements.

The light of the spliced lighting device 1 can be projected in multiple directions, which not only improves the uniformity of light distribution but also expands the illumination range. Therefore, the spliced lighting device 1 can conform to actual requirements.

The embodiment just exemplifies the present invention and is not intended to limit the scope of the present invention; any equivalent modification and variation according to the spirit of the present invention is to be also included within the scope of the following claims and their equivalents.

To sum up, according to the embodiments of the present invention, the spliced lighting device includes a frame, a first bracket and a first light source board. The frame includes a plurality of frame strips spliced with each other. The frame strips are hollow, and includes a first frame strip having a first opening and a first groove. The first groove is disposed on the inner surface of the first frame strip and corresponding to the first opening. The first bracket has a first protrusion disposed on one side of the first bracket and inserted into the first groove, such that the first bracket is fixed on the inner surface of the first frame strip. The first light source board is disposed on the other side of the first bracket. The spliced lighting device can be combined with several support posts to serve as various storage shelves. Additionally, via the structural design of the first protrusion and first groove, the first bracket can be conveniently fixed to the inner surface of the first frame strip and is less likely to detach. As a result, both the manufacturing and assembly processes of the spliced lighting device can be significantly simplified, which can greatly reduce the overall cost of the spliced lighting device.

Further, according to the embodiments of the present invention, the frame strips include a second frame strip. The spliced lighting device further includes a second bracket and a second light source board. The second frame strip has a second opening and a second groove. The second groove is disposed on the inner surface of the second frame strip and corresponding to the second opening. The second light source board is disposed on the other side of the second bracket. The orientation of the first opening is different from that of the second opening. Thus, the light of the spliced lighting device can be projected in at least two directions, which not only improves the uniformity of light distribution but also expands the illumination range. Therefore, the spliced lighting device can meet actual requirements.

Moreover, according to the embodiments of the present invention, the spliced lighting device can be connected to an external power source via an adapter module. The adapter module includes a controller, which can be used to adjust the light and/or color temperature of the spliced lighting device. The user can operate the controller to adjust the light and/or color temperature of the spliced lighting device according to actual needs. As a result, the spliced lighting device is not only more convenient to use but also more flexible in application.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. A spliced lighting device comprising:

a frame comprising a plurality of frame strips spliced with each other, wherein the frame strips are hollow, and comprises a first frame strip having a first opening and a first groove, and the first groove is disposed on an inner surface of the first frame strip and corresponding to the first opening;

a first bracket having a first protrusion disposed on one side of the first bracket and inserted into the first groove, whereby the first bracket is fixed on the inner surface of the first frame strip;

a first light source board disposed on another side of the first bracket; and a first lens disposed on the first opening to cover the first opening.

2. The spliced lighting device of claim 1, wherein the frame strips comprises a second frame strip having a second opening and a second groove, and the second groove is disposed on an inner surface of the second frame strip and corresponding to the second opening.

3. The spliced lighting device of claim 2, wherein the first frame strip and the second frame strip are arranged opposite to each other.

4. The spliced lighting device of claim 2, wherein an orientation of the first opening is different from an orientation of the second opening.

5. The spliced lighting device of claim 2, further comprising a second bracket, wherein one side of the second bracket has a second protrusion and the second protrusion is inserted into the second groove, whereby the second bracket is fixed on the inner surface of the second frame strip.

6. The spliced lighting device of claim 5, further comprising a second light source board disposed on another side of the second bracket.

7. The spliced lighting device of claim 6, further comprising a second lens disposed on the second opening to cover the second opening.

8. The spliced lighting device of claim 1, further comprising a plurality of connection elements, wherein the frame strips are spliced with each other via the connection elements.

9. A spliced lighting device comprising:

a frame comprising a plurality of frame strips spliced with each other, wherein the frame strips are hollow, and comprises a first frame strip having a first opening and a first groove, the first groove is disposed on an inner surface of the first frame strip and corresponding to the first opening, and each of the frame strips is formed by folding a foldable board;

a first bracket having a first protrusion disposed on one side of the first bracket and inserted into the first groove, whereby the first bracket is fixed on the inner surface of the first frame strip; and a first light source board disposed on another side of the first bracket.

* * * * *